US010505634B2

(12) United States Patent
Fischer et al.

(10) Patent No.: US 10,505,634 B2
(45) Date of Patent: Dec. 10, 2019

(54) DIGITAL DISTRIBUTED ANTENNA SYSTEMS AND METHODS FOR ADVANCED CELLULAR COMMUNICATION PROTOCOLS

(71) Applicant: CommScope Technologies LLC, Hickory, NC (US)

(72) Inventors: Larry G. Fischer, Waseca, MN (US); Jody Forland, St. Bonifacius, MN (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/116,515

(22) Filed: Aug. 29, 2018

(65) Prior Publication Data

US 2018/0375581 A1 Dec. 27, 2018

Related U.S. Application Data

(63) Continuation of application No. 15/642,016, filed on Jul. 5, 2017, now Pat. No. 10,075,243, which is a
(Continued)

(51) Int. Cl.
| | |
|---|---|
| *H04B 10/00* | (2013.01) |
| *H04B 10/2575* | (2013.01) |
| *H04W 72/04* | (2009.01) |
| *H04B 7/26* | (2006.01) |
| *H04W 88/08* | (2009.01) |

(52) U.S. Cl.
CPC ..... *H04B 10/25752* (2013.01); *H04B 7/2606* (2013.01); *H04W 72/042* (2013.01); *H04W 72/0413* (2013.01); *H04W 88/085* (2013.01)

(58) Field of Classification Search
CPC .......... H04B 10/25752; H04B 7/2606; H04W 72/0413; H04W 72/042; H04W 88/085
See application file for complete search history.

(56) References Cited

U.S. PATENT DOCUMENTS

| | | |
|---|---|---|
| 9,031,147 B2 | 5/2015 | Kim et al. |
| 9,722,703 B2 | 8/2017 | Fischer et al. |
| | (Continued) | |

OTHER PUBLICATIONS

Iwamura et al. "Relay Technology in LTE-Advanced," Published in NTT DOCOMO Technical Journal vol. 12 No. 2 pp. 29-36.
(Continued)

*Primary Examiner* — Khai M Nguyen
(74) *Attorney, Agent, or Firm* — Fogg & Powers LLC

(57) ABSTRACT

Digital distributed antenna systems and methods for advanced cellular communication protocols are provided. In one embodiment, a digital distributed antenna system comprises: a host unit; a plurality of remote antenna units each communicatively coupled to the host unit, wherein a first digitized RF signal comprising a plurality of data streams is communicated between the host unit and a first remote antenna unit of the plurality of remote antenna units; and a signal conditioning and control module that converts an original version of at least a first data stream to baseband data, wherein the signal conditioning and control module replaces the original version of the first data stream in the first digitized RF signal with a modified version of the first data stream by modifying data derived from the baseband data.

22 Claims, 5 Drawing Sheets

Related U.S. Application Data continuation of application No. 14/663,884, filed on Mar. 20, 2015, now Pat. No. 9,722,703.

(60) Provisional application No. 61/968,697, filed on Mar. 21, 2014.

(56) References Cited

U.S. PATENT DOCUMENTS

| | | | |
|---|---|---|---|
| 2005/0135623 A1* | 6/2005 | Bahr | G06F 21/62 |
| | | | 380/270 |
| 2005/0157675 A1 | 7/2005 | Feder et al. | |
| 2009/0213275 A1* | 8/2009 | Trager | H04N 5/44 |
| | | | 348/729 |
| 2010/0178936 A1* | 7/2010 | Wala | G01S 5/0054 |
| | | | 455/456.2 |
| 2012/0027145 A1 | 2/2012 | Uyehara et al. | |
| 2012/0250740 A1 | 10/2012 | Ling | |
| 2012/0263152 A1 | 10/2012 | Fischer et al. | |
| 2013/0003658 A1 | 1/2013 | Stewart et al. | |
| 2014/0024402 A1 | 1/2014 | Singh | |
| 2014/0119281 A1* | 5/2014 | Kummetz | H04L 1/00 |
| | | | 370/328 |
| 2014/0146905 A1 | 5/2014 | Zavadsky et al. | |
| 2014/0306841 A1* | 10/2014 | Stapleton | G01S 19/01 |
| | | | 342/357.39 |
| 2016/0049966 A1 | 2/2016 | Wang et al. | |
| 2018/0062744 A1 | 3/2018 | Fischer et al. | |

OTHER PUBLICATIONS

United States Patent and Trademark Office, "Final Office Action from U.S. Appl. No. 14/663,884 dated Aug. 16, 2016" pp. 1-12, Published in US.

United States Patent and Trademark Office, "Notice of Allowance from U.S. Appl. No. 14/663,884 dated Apr. 12, 2017," pp. 1-12, Published in US.

United States Patent and Trademark Office, "Notice of Allowance from U.S. Appl. No. 14/663,884 dated Nov. 14, 2016," pp. 1-8, Published in US.

United States Patent and Trademark Office, "Notice of Allowance from U.S. Appl. No. 15/642,016 dated May 9, 2018," pp. 1-8, Published in US.

United States Patent and Trademark Office, "Office Action from U.S. Appl. No. 14/663,884 dated Mar. 22, 2016," pp. 1-11, Published in US.

United States Patent and Trademark Office, "Office Action from U.S. Appl. No. 15/642,016 dated Jan. 8, 2018," pp. 1-15, Published in US.

* cited by examiner

DIGITAL DISTRIBUTED ANTENNA SYSTEMS AND METHODS FOR ADVANCED CELLULAR COMMUNICATION PROTOCOLS

CROSS-REFERENCE TO RELATED APPLICATIONS

This is a Continuation Application, claiming priority to, and the benefit of, U.S. patent application Ser. No. 15/642,016, titled "DIGITAL DISTRIBUTED ANTENNA SYSTEMS AND METHODS FOR ADVANCED CELLULAR COMMUNICATION PROTOCOLS", filed on Jul. 5, 2017, which is a Continuation Application, claiming priority to, and the benefit of, of U.S. patent application Ser. No. 14/663,884, titled "DIGITAL DISTRIBUTED ANTENNA SYSTEMS AND METHODS FOR ADVANCED CELLULAR COMMUNICATION PROTOCOLS", filed on Mar. 20, 2015, which claims priority to, and the benefit of, U.S. Provisional Patent Application No. 61/968,697, titled "DIGITAL DISTRIBUTED ANTENNA SYSTEMS AND METHODS FOR ADVANCED CELLULAR COMMUNICATION PROTOCOLS", filed on Mar. 21, 2014, and which are each incorporated herein by reference in their entirety.

BACKGROUND

A typical Digital Distributed Antenna System (DDAS) in the art today operate in the downlink direction by providing a point-to-multipoint digital transport for delivering one or more digitized RF signals from a centralized host to a plurality of remotely located antenna units, each of which broadcast the digitized RF signals as an over-the-air analog RF signal. Each digitized RF signal carries data samples of a modulated electromagnetic radio-frequency waveform. Each of the remote antenna units in the DDAS receive the same stream of digitized RF signals and each produces a corresponding analog modulated RF waveform version of the digitized RF signals, and broadcast that waveform as an over-the-air RF signal.

A DDAS permits the over-the-air RF signal to cover a much larger and geographically tailored region because each of the remote antenna units (RAUs) of the DDAS can be specifically located to reach areas where service is desired. For example, a one RAU of a DDAS can be placed to cover an outside commons area of a campus while another RAU of the DDAS can be placed within an auditorium on campus because that auditorium's structure interferes with reception of signals from the outside. However, with the advent and continued development of Long-Term Evolution (LTE) and other cellular protocols, the modulation of cellular carrier signals continues to become increasingly complex as compared to legacy protocols, such as Edge and GSM for example.

For the reasons stated above and for other reasons stated below which will become apparent to those skilled in the art upon reading and understanding the specification, there is a need in the art for improved digital distributed antenna systems and methods for advanced cellular communication protocols.

SUMMARY

The Embodiments of the present invention provide improved digital distributed antenna systems and methods for advanced cellular communication protocols and will be understood by reading and studying the following specification.

Digital distributed antenna systems and methods for advanced cellular communication protocols are provided. In one embodiment, a digital distributed antenna system comprises: a host unit; a plurality of communication links; a plurality of remote antenna units each coupled to the host unit by one of the plurality of communication links, wherein the communication links transport a downlink digitized RF signal from the host unit to the plurality of remote antenna units, and wherein the remote antenna units are each configured to generate an over-the-air analog RF signal via an antenna from the downlink digitized RF signal; and a localized signal conditioning and control module that extracts from a first digitized RF signal at least one data stream and converts the at least one data stream to baseband data stored in a memory.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide digital distributed antenna systems and methods that incorporated localized signal conditioning and control functionality into one or more remote antenna legs comprising a Digital Distributed Antenna System (DDAS). That is, this disclosure proposes that remote antenna units locally process the signal or incorporate other conditioning and control functionality to improve the quality of services provided to mobile subscribers. For example, in some embodiments, a remote antenna unit would digitally demodulate a digitized RF signal received from the DDAS host, process the resulting demodulated signal (either in part or as a whole), and then digitally re-modulate the signal into a modified digital RF signal that is provided to radiohead equipment for broadcast. While in baseband form at the RAU, a variety of signal quality enhancements may be applied to increase the signal to interference ratio for communications being transmitted from the RAU to mobile subscriber units. Further, because the demodulation, processing, and re-modulation is being performed in a digital domain, particular data streams (for example, specific cellular communication channels)can be extracted from the digitized RF signal received from the DDAS host for locally specialized processing, while allowing the balance of other data streams in the digitized RF signal to flow through the RAU without modification.

Figure 1:
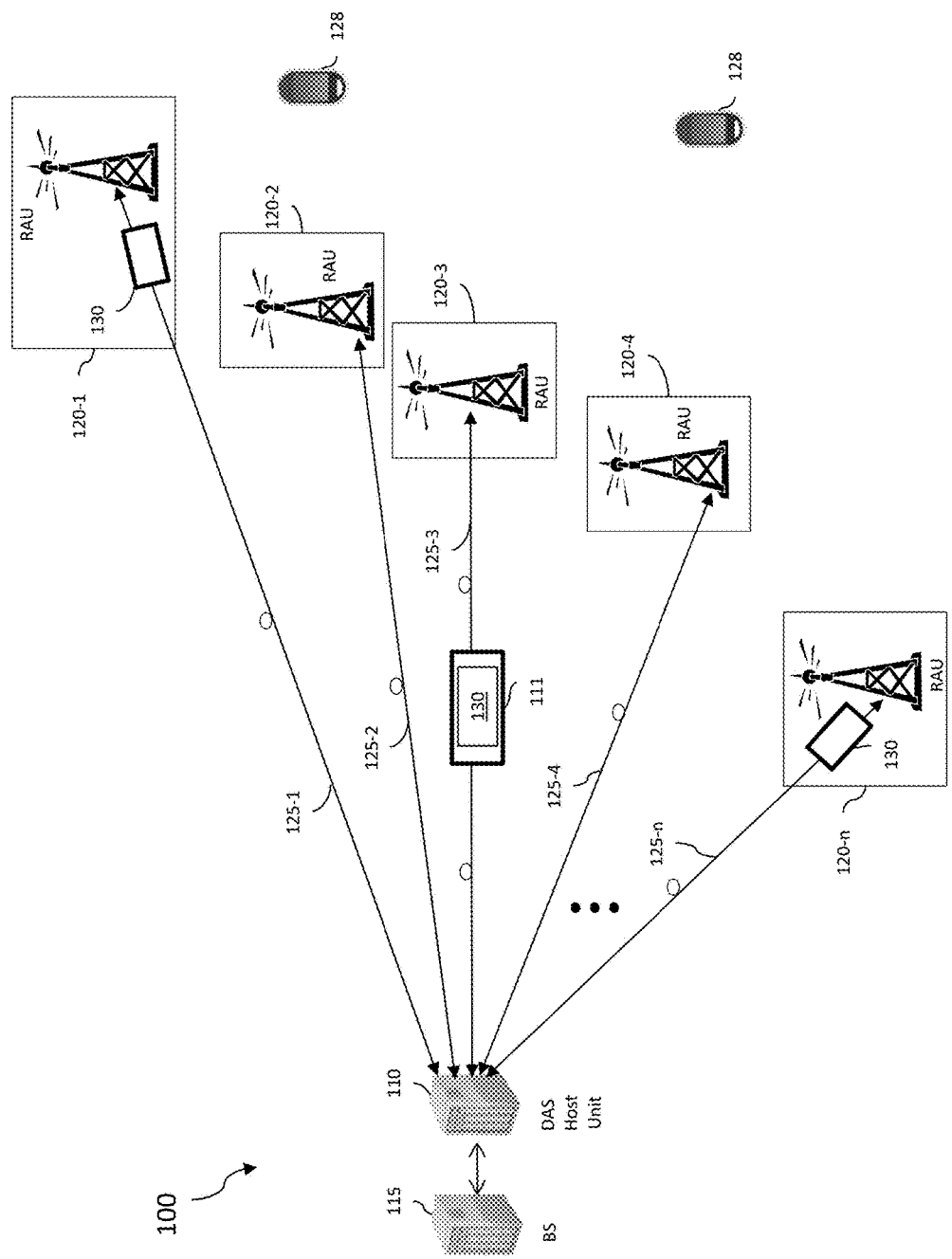
FIG. 1 is a diagram illustrating a digital distributed antenna system of one embodiment of the present invention.

FIG. 1 is a block diagram illustrating a DDAS 100, of one embodiment of the present disclosure. DDAS 100 comprises a host unit 110 coupled to a plurality of remote antenna units (shown at 120-1 to 120-*n*). The host unit 110, is coupled to at least one upstream component, such as a cellular base station or base transceiver station for example, shown as BS 115. In the downlink direction, DDAS 100 operates as a point-to-multipoint transport for digitized RF signals. That is, downlink digitized RF signals received by DDAS 100 at host unit 110 from a BS 115 are simultaneously transported to each of the remote antenna units 120-1 to 120-*n*. Embodiments described herein may also apply to uplink transport of digitized RF signals. As used herein, uplink transport of digitized RF signals refers to the process of receiving over-the-air RF communication signals from subscriber units at the RAUs 120-1 to 120-*n* of DDAS 100, sampling the analog RF communication signals to produce uplink digitized RF signals, and summing the uplink digitized RF signals received from RAUs 120-1 to 120-*n* at host unit 110 to provide a unified stream of digitized RF signals to upstream components, such as BS 115.

In other embodiments, host unit 110 itself may incorporate at least part of the cellular base station functionality of BS 115 integrally with its functions as a DDAS host unit. For example, in other embodiments in operation, host unit 110 receives from upstream sources such as, but not limited to analog baseband frequency, analog passband or carrier-modulated frequency, analog intermediate frequency, or Common Public Radio Interface standard (CPRI) signals including digital baseband frequency and digital intermediate frequency. It then digitally up-converts that data into digitized RF signals which are modulated in accordance with one or more over-the-air cellular modulation protocols.

As shown in FIG. 1, host unit 110 is coupled to RAUs 120-1 to 120-*n* through bi-directional point-to-point communication links 125-1 to 125-*n*. In alternate implementations, communications links 125-1 to 125-*n* may be either digital or analog transport links, or combinations thereof In the particular embodiment shown in FIG. 1, communication links 125-1 to 125-*n* are shown as fiber optic links. However, in other embodiments, other communications means such as but not limited to co-axial cables, CAT-5 cables, or microwave communication links may be utilized in various combinations. As described below, RAUs 120-1 to 120-*n* each include elements for performing various radiohead functions pertinent to generating and transmitting downlink analog modulated over-the-air RF waveforms and receiving and processing uplink analog modulated over-the-air RF waveforms.

In the example DDAS 100 shown in FIG. 1, at least one, but not necessarily all, of RAUs 120-1 to 120-*n* also utilize localized signal conditioning and control functionality which permits local control and manipulation of the digital RF signals communicated with host unit 110 in order to improve the signal quality of analog RF signals exchanged with mobile subscriber units 128. For example the RAUs 120-1 and 120-*n* of DDAS 100 each comprise within the RAU a localized signal conditioning and control module 130. RAUs 120-2, 3 and 4 do not. However, as shown in FIG. 1, in some implementations, one or more of the RAUs may be indirectly coupled to host unit 115, such as shown for RAU 120-3 where there is at least one intervening device 111 (which may comprise an intermediate or expansion unit, for example). In one embodiment, the localized signal conditioning and control module 130 utilized for RAU 120-3 may be implemented in the intervening device 111 rather than within the RAU 120-3. In still other embodiments, the functionality described for localized signal conditioning and control module 130 may be implemented for a particular RAU in the host unit 110 as further described below. Because each localized signal conditioning and control module 130 for each RAU can be configured to implement different functionalities, a set of local functionalities available to a particular RAU can be tailored to the needs or conditions relevant to that particular RAU.

Figure 2:
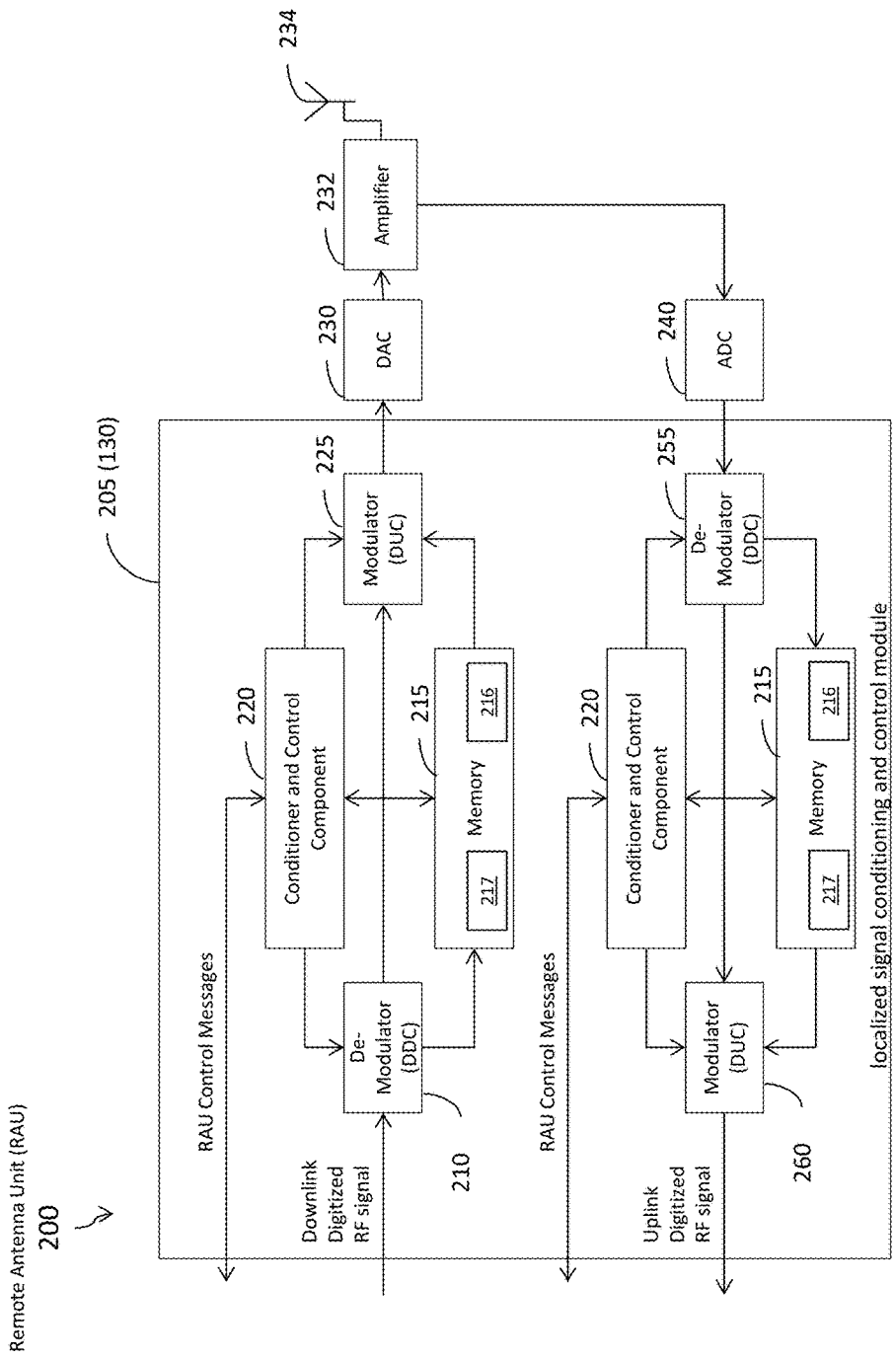
FIG. 2 is a diagram illustrating a remote antenna unit of digital distributed antenna system of one embodiment of the present invention.

FIG. 2 is a block diagram of an RAU 200 having a localized signal conditioning and control module 205. In at least one embodiment, localized signal conditioning and control module 205 implements the module 130 described with respect to FIG. 1 above. Any of the options or functions attributed to RAU 200 may be attributed to the RAUs 120-1 to 120-*n* described above and vice-versa. RAU 200 comprises components for downlink digital RF signal processing including localized signal conditioning and control module 205, digital to analog converter (DAC) 230, an amplifier 232 and an antenna 234. To support generation of an analog RF signal for over-the-air broadcast, amplifier 232 includes a high power amplifier. The localized signal conditioning and control module 205 comprises a downlink digital demodulator 210, a memory 215, a conditioning and control component 220, and downlink digital modulator 225. In one embodiment, digital demodulator 210 and digital modulator 225 may be implemented respectively by a digital down-converter (DDC) and a digital up-converter (DUC). In some embodiments, digital demodulator 210 may perform digital down conversion if required, followed for example by Air Interface Protocol Decoding/De-Modulation from Digitized Baseband RF. In some embodiments, digital modulator 225 may perform Air Interface Protocol Encoding/Modulation to Digitized Baseband RF, followed by digital up conversion to Carrier Modulated/Passband RF.

To facilitate upstream transport, RAU 200, further comprises an analog-to-digital converter (ADC) 240 coupled to antenna 234 via amplifier 232. ADC 240 produces a string of digital RF signals by sampling an over-the-air uplink analog RF signal received by antenna 234. The localized signal conditioning and control module 205 further comprises an uplink digital demodulator 255 and an uplink digital modulator 260 which are also coupled to memory 215 and controlled by conditioning and control component 220. In one embodiment, digital demodulator 255 and digital modulator 260 may be implemented respectively by a digital down-converter (DDC) and a digital up-converter (DUC). In some embodiments, the uplink digital demodulator 225 will perform digital down conversion from Carrier Modulated or Passband RF to Digitized Baseband RF, followed by decoding/demodulation of the Air Interface Protocol. In some embodiments, uplink digital modulator 260 will perform Air Interface Protocol Encoding/Modulation to Digitized Baseband RF, followed by digital up conversion if required.

One or more of the components within RAU 200, including but not limited to any of demodulators 210 and 225, memory 215, conditioning and control component 220, or modulators 225 and 260 may be implemented by a field-programmable gate array (FPGA) within RAU 200. In one embodiment, memory 215 stores a data set 216 accessed by conditioning and control component 220 that defines a set of local signal conditioning functionalities available at RAU 200.

In one embodiment in operation, RAU 200, utilizing localized signal conditioning and control module 205, implements a digitized RF signal process referred to herein as decode and condition. That is, when RAU 200 receives digitized RF signals from host unit 110, module 205 demodulates at least part of the digitized RF signal into baseband data and stores it into memory 215. As the term is used herein, "baseband data" refers to digital RF samples that have been down-converted and/or decoded from their as-received modulated state to become Digitized RF samples representing baseband frequency. A distinction should be noted between this Digitized Baseband RF data, and the Digital Baseband data representing the decoded/demodulated Air Interface Protocol. That is, Digitized Baseband RF refers to IQ samples of the Baseband RF signal while Digital Baseband refers to decoded/demodulated Air interface Protocol (AIP) Layer 1. With respect to the term "Modulation", it should be appreciated that the term may refer to taking Baseband RF and modulating it with a carrier. In may also refer to taking an AIP Layer 1 signal to Digitized Baseband RF data. Thus two stages of modulation occur to bring a signal from AIP Layer 2 to a carrier modulated RF signal: 1) AIP Layer 1 modulation, and 2) baseband to intermediate frequency or carrier frequency modulation.

As mentioned above, because demodulation is being performed digitally, particular data streams (for example, specific cellular communication channels, carriers or sub-carriers) within the received digitized RF signal can be extracted (for example, decoded at the AIP Layer 2) and stored into memory 215 for subsequent processing, while other data streams being transported via the digitized RF signal continue to flow through RAU 200 RAU unmodified. The extracted stream can also be decoded at AIP Layer 1 in order to process the data and/or obtain a signal to noise improvement. This could be beneficial due to the forward error correction which may be employed at AIP Layer 1. Extraction/decoding can be performed on specific sub-carriers in cases where multiple carriers have been combined into a wider slice of RF spectrum, or for specific LTE orthogonal frequencies within the AIP Layer 1.

Once baseband data (either uplink or downlink) has been stored into memory 215, any number of signal enhancement operations may then be performed on the stored data by conditioning and control component 220. In one simple embodiment, only AIP Demodulation and AIP Re-Modulation would be performed in order to reduce system noise. In other embodiments conditioning and control component 220 can identify that the digitized RF signal includes a stream of information modulated onto a particular RF channel that, if broadcast as an over-the-air signal, could experience local signal quality challenges.

For example, RAU 200 may have a priori knowledge (such as information stored in a database 217 in memory 215) that indicates a given frequency is to be avoided (for example, where it is known that a local interference source is present in the vicinity of RAU 200) because of potential degraded transmissions on that RF channel. In that case, conditioning and control component 220 can increase the signal gain of the baseband data to increase the signal to interference ratio of the re-modulated broadcast of the signal from RAU 200, adjust signal phase, or apply one or more other signal optimizations to overcome the interference. For example, conditioning and control component 220 can apply a digital pre-distortion based on characteristics known about the interference (which also may be stored in database 217). That is, where RAU 200 is aware that the transmitted analog RF signal will encounter a certain distortion due to local environmental conditions, it can apply a digital pre-distortion to the baseband data. Then when the transmitted analog RF signal encounters the environmental distortion, the sum of the environmental distortion with the RAU applied digital pre-distortion will result in a non-distorted signal being received at the subscriber unit 128. Alternately, conditioning and control component 220 can instruct digital modulator 225 to avoid the use of that RF channel. In that case, digital modulator 225 can up-convert the baseband data onto another RF channel, and thus shift the associated stream of information from the poor RF channel. In some embodiments, such as an LTE implementation, this is coordinated by module 205 with user equipment (UEs) and Evolved Node Bs (eNodeBs) using a control plane. For example, in one embodiment, conditioning and control component 220 will instruct demodulator 210 to extract and down-convert information streams from the digitized RF signal that are modulated for degraded RF channels, and then instruct modulator 225 to up-convert the resulting baseband data for transmission on a better quality RF channel. It should be noted that while this localized signal conditioning is being performed at one RAU (such as RAU 120-1) at a second RAU of DDAS 100, the same information stream received via the digitized RF signals may simply flow through and be broadcast without such conditioning, or receive different conditioning appropriate for the local conditions at the second RAU.

As would be appreciated by one of ordinary skill in the art upon studying this disclosure, a number of other functions may be applied to information streams by conditioning and control component 220. Localized signal conditioning performed at a remote antenna unit can overcome Signal to Interference plus Noise power Ratio (SINR) deteriorations that affect different areas covered within a DDAS's geographic coverage region differently, ultimately benefiting data throughput. For example, digital channel condition 220 may perform processing such as, but not limited to, ciphering (i.e. AIF encoding/decoding) and user-data concatenation-segmentation-reassembly, before re-modulating and transmitting the user data. In one embodiment, conditioning and control component 220 adds an identification code onto the physical layer that is different than that of the base station 115 that originated the downlink digitized RF signal. In one embodiment, the identification code allows a subscriber unit 128 to differentiate an instance of an information stream received from one RAU from another instance of the same information stream received from another RAU of the same DDAS, or identify if the information stream being transmitted has been modified by the RAU, or has been passed through unmodified from what was received at host unit 110.

in other embodiments, conditioning and control component 220 can implement Layer 2 processing for monitoring/reporting, or even for transparent RAU based optimization.

Such processes would extend beyond just storing Layer 1 decoded data into memory so it can be read and re-encoded at Layer 1. For example, RAU 200, (via conditioning and control component 220) may transparently implement functions such as mobility control, retransmission control (for example using Automatic Repeat Request (ARQ)) and user-data concatenation-segmentation-reassembly) between the base station 115 and subscriber units 128. In still further embodiments, physical layer control signals which can include a Channel Quality Indicator (CQI), and Hybrid ARQ (HARQ) can be extended to an individual RAU, for example so that the RAU is recognized as a base station from the viewpoint of a subscriber station. In one embodiment, RAU 200 is equipped to provide the same radio protocols as those of an LTE base station, including one or more of the Packet Data Convergence Protocol (PDCP) for user data ciphering and header compression, Radio Link Control (RLC) protocol for retransmission control by ARQ, concatenation/segmentation/reassembly the Service Data Unit (SDU), and in-sequence packet delivery. Medium Access Control (MAC) protocol for HARQ and user data scheduling and Radio Resource Control (RRC) protocol for mobility, quality-of-service (QoS), and security control.

Figure 2A:
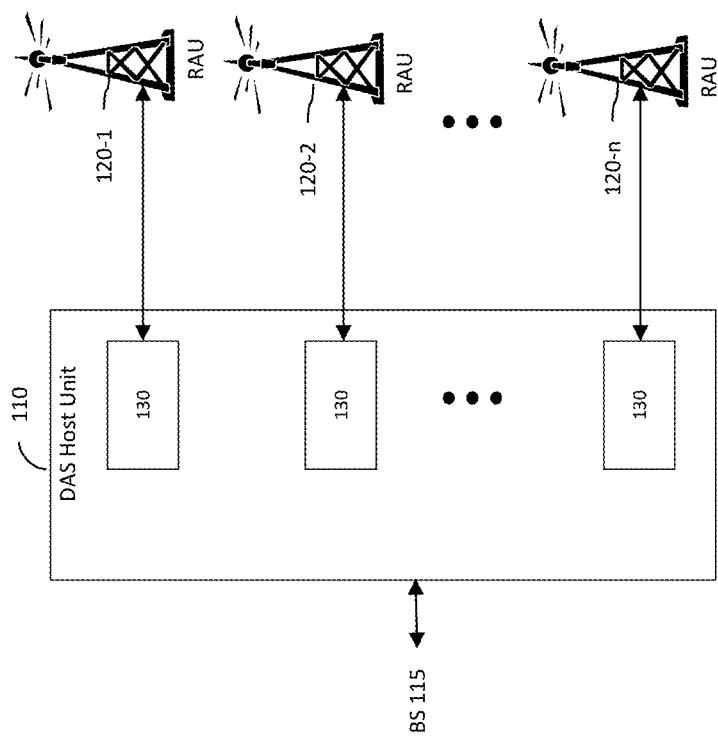
FIG. 2A is a diagram illustrating a host unit of digital distributed antenna system of one embodiment of the present invention.

As mentioned above, the functions performed by conditioning and control component 220 described herein can also be accomplished by locating the localized signal conditioning and control module 130 associated with a particular RAU at the host unit 110 as illustrated in FIG. 2A, or alternatively by performing one or more conditioning and control component 220 functions at host unit 110 in conjunction with performing one or more conditioning and control component 220 functions at the particular RAU. Also as mentioned above, one or more conditioning and control component 220 functions may also be performed at localized signal conditioning and control module 130 located in an intervening device 111 between the host unit 110 and a particular RAU.

Figure 3:
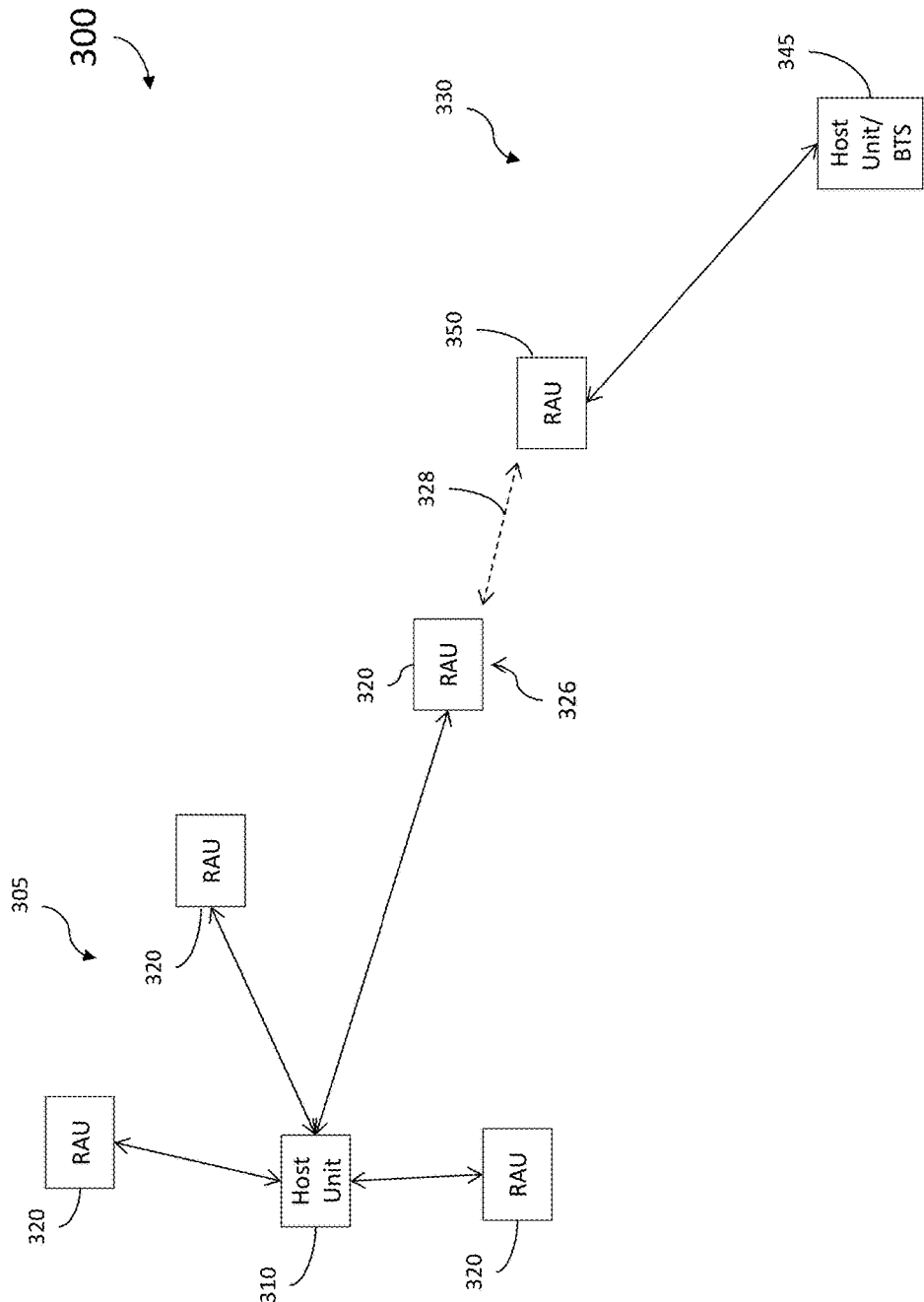
FIG. 3 is a diagram illustrating a digital distributed antenna system of one embodiment of the present invention.

FIG. 3 is a block diagram illustrating generally at 300 another embodiment of the present disclosure. DDAS 305 comprises a host unit 310 and a plurality of RAUs 320. In some embodiments, an RAU 320 may be implemented using an RAU 120-1 to 120-$n$ or RAU 200 such as described above with respect to FIGS. 1, 2 and 2A. In this embodiment, one of the RAUs 320 of DDAS 305 (shown at 326) functions as an over-the-air repeater unit to transport cellular communications via over-the-air transmission (indicated by 328) to and/or from a neighboring DDAS or cellular system cell (shown 330).

In one implementation, RAU 326 is configured with and implemented using a localized signal conditioning and control functionality such as the localized signal conditioning and control modules 130 and 205 described above. For illustrative purposes, it can be supposed that RAU 326 is be located at some an extreme distance from host unit 310 such at the edge of DDAS 305's cell coverage range such that mobile subscribers 128 that reach this region are supposed to be handed off to another base station. RAU 326 functions as a freestanding repeater module that will store and hold in memory downlink data streams until the subscriber unit is successfully handed-off. In one embodiment, downlink information stored at RAU 326 may be forwarded by an over-the-air relay signal 328 from RAU 326 to the host unit/base station 345 accepting the subscriber, so that it may deliver the downlink information to the subscriber unit. For example, host unit/base station 345 may be coupled to an RAU 350 that receives the over-the-air relay signal 328 from RAU 326 and either communicates it to host unit/base station 345, or directly retransmits the downlink information to the subscriber unit itself.

In one embodiment, the set of local functionalities available at any of the RAU embodiments described above is static and hard coded into the RAU. In other embodiments, a complete set of local functionalities available at a particular RAU may be hard coded into the RAU, but the RAU may receive configuration messages from its host unit that can turn particular functionalizes on or off, or provide other operating parameters associated with the functionalities. In this way, the set of local functionalities can be dynamically tailored at that RAU via the host unit by the system operator. In still other embodiment, the set of local functionalities that are available at an RAU may be modified by revising sets of implementing code, algorithms and/or parameters executed by the RAU, that are received via configuration messages from the host unit. In some embodiments, the RAU may provide feedback to the host unit regarding local operating conditions, from which the host unit may then decide to revise the set of local functionalities in affect at that RAU.

Several means are available to implement the various embodiments discussed in this specification. These means include, but are not limited to programmable hardware including digital computer systems, microprocessors, programmable controllers and field programmable gate arrays. Therefore other embodiments of the present disclosure include program instructions resident on computer readable media which when implemented by such programmable hardware, enable them to implement said embodiment. As used herein, the term "computer readable media" refers to tangible memory storage devices having physical forms. Such physical forms may include any form of computer memory device, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Figure 4:
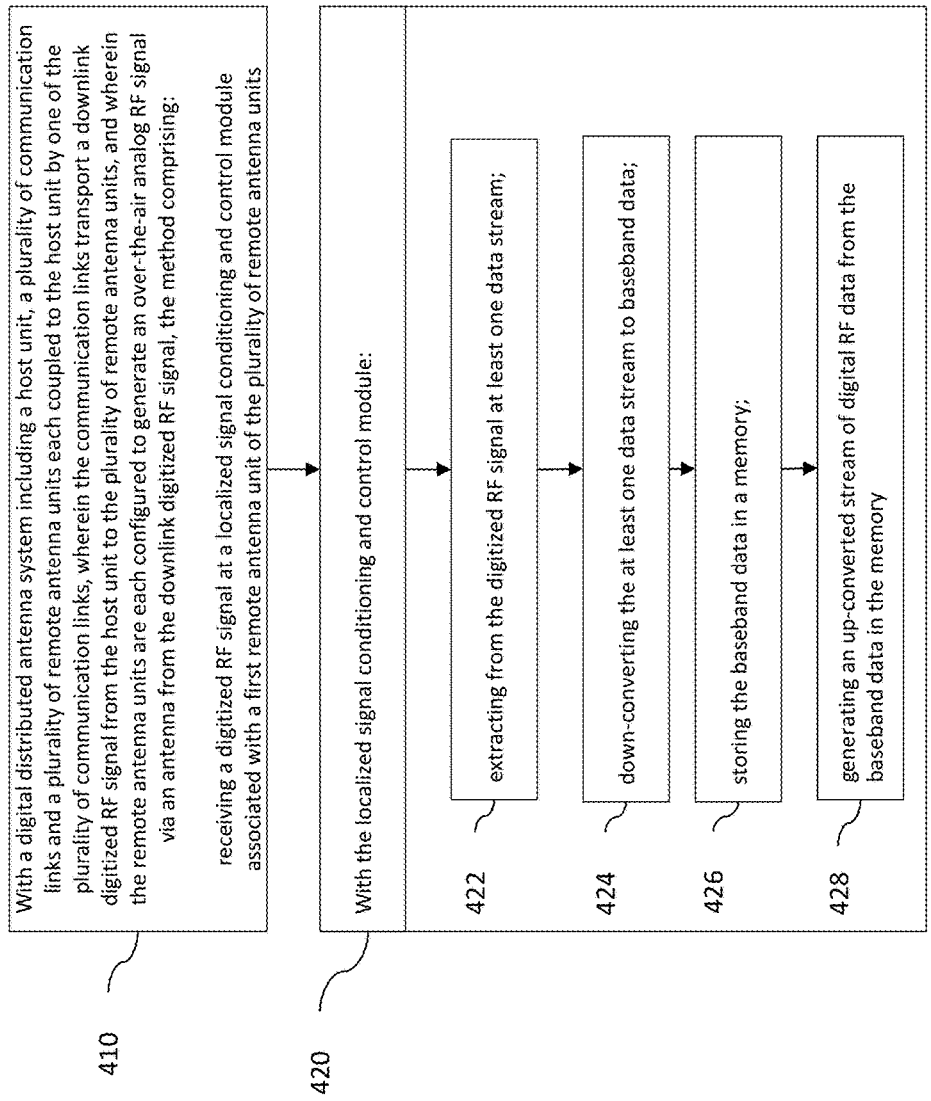
FIG. 4 is a flow chart illustrating a method for a digital distributed antenna system of one embodiment of the present invention.

FIG. 4 is a flow chart illustrating one method 400 of the present disclosure which may also serve as an algorithm for implementing one or more embodiments such as those describe above. Accordingly, any of the options, alternatives or functions attributed to an RAU described above with respect to any of FIGS. 1, 2, 2A and 3 may be attributed to the RAU described in this method and vice-versa. The method begins at 410 with a digital distributed antenna system including a host unit, a plurality of communication links and a plurality of remote antenna units each coupled to the host unit by one of the plurality of communication links, wherein the communication links transports a downlink digitized RF signal from the host unit to the plurality of remote antenna units, and wherein the remote antenna units are each configured to generate an over-the-air analog RF signal via an antenna from the downlink digitized RF signal. The method comprises at 410 receiving a digitized RF signal at a localized signal conditioning and control module associated with a first remote antenna unit of the plurality of remote antenna units. As mentioned above, a localized signal conditioning and control module for an RAU may be located in the RAU, in the host unit, in an intervening device between the RAU and the host unit, or a combination thereof. At the localized signal conditioning and control module (illustrated at 420), the method continues to 422 with extracting from the digitized RF signal at least one downlink data stream. As mentioned above, extracting may be performed on specific sub-carriers in cases where multiple carriers have been combined into a wider slice of RF spectrum, or, for example, on specific LTE orthogonal frequencies within the AIP Layer 1.

Because extracting/demodulation is being performed digitally, particular data streams (for example, specific cellular communication channels, carriers or sub-carriers) within the received digitized RF signal can be extracted for subsequent processing, while other data streams being transported via the digitized RF signal can flow through the RAU unmodified. The method accordingly proceeds to 424 with down-converting the at least one data stream to baseband data (such as digitized Baseband RF). This step may also comprise AIP Level 1 encoding/decoding.

The method proceeds to 426 with storing the baseband data in a memory. It is expressly noted that once the baseband data has been extracted and stored into memory as described in blocks 422-426, any number of the signal enhancement operations may then be performed on the stored data as described in the embodiments described above with respect to FIG. 1-3. The method proceeds to 428 with generating an up-converted stream of digital RF data from the baseband data in the memory. This method may be applied to either uplink or downlink data transport on the DDAS. In one embodiment where method 400 is being applied to downlink data, method 400 then proceeds with generating at least part of an over-the-air analog RF signal from the up-converted stream of digital RF data. In one embodiment where method 400 is being applied to uplink data, method 400 proceeds with transporting the up-converted stream of digital RF data to the host unit where it is combined with uplink digital RF signals from the other RAUs into a unified uplink digital RF signal and communicated to a base station.

The signal enhancements applied by localized signal conditioning and control module to an extracted data stream can include, but are not limited to signal gain adjustments, signal phase adjustments, shifts from one RF carrier channel to another or fine adjustments to carrier frequency, and digital pre-distortion. The RAU may also implement with the base station one or more of mobility control, retransmission control, user-data concatenation-segmentation-reassembly and/or physical layer control signals. The Localized signal conditioning and control module can also implement Layer 2 processing for monitoring/reporting, or even for transparent RAU based optimization. Such processes would extend beyond just storing Layer 1 decoded data into memory so it can be read and re-encoded at Layer 1. The module may also implement with the base station one or more of mobility control, retransmission control, user-data concatenation-segmentation-reassembly and/or physical layer control signals. For example the localized signal conditioning and control module may transparently implement functions such as mobility control, retransmission control (for example using Automatic Repeat Request (ARQ)) and user-data concatenation-segmentation-reassembly) between the base station and subscriber units. In still further embodiments, physical layer control signals which can include a Channel Quality Indicator (CQI), and Hybrid ARQ (HARD) can be extended to an individual RAU, for example so that the RAU is recognized as a base station from the viewpoint of a subscriber station. In one embodiment, the localized signal conditioning and control module is equipped to provide the same radio protocols as those of an LTE base station, including one or more of the Packet Data Convergence Protocol (PDCP) for user data ciphering and header compression, Radio Link Control (RLC) protocol for retransmission control by ARQ, concatenation/segmentation/reassembly the Service Data Unit (SDU), and in-sequence packet delivery. Medium Access Control (MAC) protocol for HARD and user data scheduling and Radio Resource Control (RRC) protocol for mobility, quality-of-service (QoS), and security control.

EXAMPLE EMBODIMENTS

Example 1 includes a digital distributed antenna system, the system comprising: a host unit; a plurality of communication links; a plurality of remote antenna units each coupled to the host unit by one of the plurality of communication links, wherein the communication links transport a downlink digitized RF signal from the host unit to the plurality of remote antenna units, and wherein the remote antenna units are each configured to generate an over-the-air analog RF signal via an antenna from the downlink digitized RF signal; and a localized signal conditioning and control module that extracts from a first digitized RF signal at least one data stream and converts the at least one data stream to baseband data stored in a memory.

Example 2 includes the system of example 1, wherein the first digitized RF signal is a downlink signal and the over-the-air analog RF signal is generated at least in part from the baseband data stored in memory.

Example 3 includes the system of any of examples 1-2, wherein the first digitized RF signal is an uplink signal and an uplink digitized RF signal is generated at least in part from the baseband data stored in memory.

Example 4 includes the system of any of examples 1-3, wherein the localized signal conditioning and control module is implemented in a first remote antenna unit of the plurality of antenna units.

Example 5 includes the system of any of examples 1-4, wherein the localized signal conditioning and control module is implemented in the host unit.

Example 6 includes the system of any of examples 1-5, wherein the localized signal conditioning and control module is implemented in an interviewing device between a first remote antenna unit and the host unit.

Example 7 includes the system of any of examples 1-6, wherein baseband data comprises one or both of Digitized Baseband RF data and Digital Baseband data.

Example 8 includes the system of any of examples 1-7, the localized signal conditioning and control module further comprising: at least one digital demodulator; a conditioner and control component; the memory; and at least one digital modulator; wherein the digital demodulator converts the at least one data stream and stores a result as the baseband data into the memory.

Example 9 includes the system of examples 8, wherein the digital modulator digitally re-modulates the baseband data into a re-modulated digital RF signal.

Example 10 includes the system of any of examples 8-9, wherein the conditioner and control components applies one or more signal optimization algorithms to the baseband data.

Example 11 includes the system of any of examples 8-10, wherein the conditioner and control components applies one or more signal optimization algorithms to the baseband data based on an activated set of functionalities defined in the memory.

Example 12 includes the system of any of examples 8-11, wherein the host unit is configured to modify the activated set of functionalities defined in the memory.

Example 13 includes the system of any of examples 8-12, wherein the digital demodulator demodulates the baseband data from a first RF channel and the digital modulator re-modulates the baseband data onto a second RF channel.

Example 14 includes the system of any of examples 8-13, wherein the conditioner and control component modifies the baseband data before the digital modulator re-modulates the baseband data onto a second RF channel.

Example 15 includes the system of any of examples 1-14, wherein the localized signal conditioning and control module applies one or more signal optimizations to the baseband data.

Example 16 includes the system of any of examples 1-15, wherein the one or more signal optimizations include at least one of the following: signal gain adjustment; a shift in RF carrier channel; a signal phase adjustment; and a digital pre-distortion.

Example 17 includes the system of any of examples 1-16, wherein the localized signal conditioning and control module is implemented by a field programmable gate array within the at least one remote antenna unit.

Example 18 includes the system of any of examples 1-17, wherein the localized signal conditioning and control module implements with the base station one or more of: mobility control; retransmission control; user-data concatenation-segmentation-reassembly; physical layer control signals.

Example 19 includes the system of example 18, wherein the retransmission control includes implementing Automatic Repeat request (ARQ).

Example 20 includes the system of any of examples 18-19, wherein the physical layer control signals include one or both of a Channel Quality Indicator (CQI), and Hybrid ARQ (HARQ).

Example 21 includes the system of any of examples 1-20, wherein the localized signal conditioning and control module is configured to implement at least one of: the Packet Data Convergence Protocol (PDCP) for user data ciphering and header compression; Radio Link Control (RLC) protocol for retransmission control by ARQ; in-sequence packet delivery; Medium Access Control (MAC) protocol for HARQ; user data scheduling; Radio Resource Control (RRC) protocol for mobility, QoS, and security control.

Example 22 includes a method for a digital distributed antenna system, the digital distributed antenna system including a host unit, a plurality of communication links and a plurality of remote antenna units each coupled to the host unit by one of the plurality of communication links, wherein the communication links transport a downlink digitized RF signal from the host unit to the plurality of remote antenna units, and wherein the remote antenna units are each configured to generate an over-the-air analog RF signal via an antenna from the downlink digitized RF signal, the method comprising: receiving a digitized RF signal at a localized signal conditioning and control module associated with a first remote antenna unit of the plurality of remote antenna units; with the localized signal conditioning and control module: extracting from the digitized RF signal at least one data stream; down-converting the at least one data stream to baseband data; storing the baseband data in a memory; and generating an up-converted stream of digital RF data from the baseband data in the memory.

Example 23 includes the method of example 22, wherein, the method further comprises: generating at least part of the over-the-air analog RF signal by up-converting the baseband data in the memory.

Example 24 includes the method of any of examples 22-23, wherein, the method further comprising: transporting the up-converted stream of digital RF data to the host unit where it is combined with uplink digital RF signals from at least one other remote antenna unit into a unified uplink digital RF signal.

Example 25 includes the method of any of examples 22-24, wherein the first remote unit comprises a conditioner and control component, the method further comprising: with the conditioner and control component, applying one or more signal optimizations to the baseband data.

Example 26 includes the method of example 25, wherein the one or more signal optimizations include at least one of the following: a signal gain adjustment; a shift in RF carrier channel; a signal phase adjustment; and a digital pre-distortion.

Example 27 includes the method of any of examples 25-26, wherein the conditioner and control components applies one or more signal optimizations to the baseband data based on an activated set of functionalities defined in a memory.

Example 28 includes the method of any of examples 25-27, wherein the host unit is configured to modify the activated set of functionalities defined in the memory.

Example 29 includes the method of any of examples 25-28, wherein with the conditioner and control component, the method further comprises implementing on or more of: mobility control; retransmission control; user-data concatenation-segmentation-reassembly; physical layer control signals.

Example 30 includes the method of example 29, wherein the retransmission control includes implementing Automatic Repeat request (ARQ).

Example 31 includes the method of any of examples 29-30, wherein the physical layer control signals include one or both of a Channel Quality Indicator (CQI), and Hybrid ARQ (HARQ).

Example 32 includes the method of any of examples 22-31, wherein the localized signal conditioning and control module modulates the baseband data onto a different RF channel than an RF channel from which it was down-converted from.

Example 33 includes the method of any of examples 22-32, wherein with the localized signal conditioning and control module, the method further comprises implementing on or more of: the Packet Data Convergence Protocol (PDCP) for user data ciphering and header compression; Radio Link Control (RLC) protocol for retransmission control by ARQ; in-sequence packet delivery; Medium Access Control (MAC) protocol for HARQ; user data scheduling; Radio Resource Control (RRC) protocol for mobility, QoS, and security control.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A digital distributed antenna system, the system comprising:
   a host unit;
   a plurality of remote antenna units each communicatively coupled to the host unit, wherein a first digitized RF signal comprising a plurality of data streams is communicated between the host unit and a first remote antenna unit of the plurality of remote antenna units; and
   a signal conditioning and control module that converts an original version of at least a first data stream to baseband data, wherein the signal conditioning and control module replaces the original version of the first data stream in the first digitized RF signal with a modified version of the first data stream by modifying data derived from the baseband data.

2. The system of claim 1, wherein the first digitized RF signal further comprises a second data stream not replaced with a modified version thereof by the signal conditioning and control module.

3. The system of claim 1, wherein the signal conditioning and control module comprises a digital demodulator that performs digital down conversion of the first data stream to produce down-converted data and air interface protocol decoding of the down-converted data to generate decoded data.

4. The system of claim 3, wherein the signal conditioning and control module comprises a digital modulator that performs air interface protocol encoding to produce encoded data from the decoded data, and digital up conversion of the encoded data to generate the modified version of the first data stream.

5. The system of claim 1, wherein a conditioner and control component applies one or more signal optimizations to the data derived from the baseband data.

6. The system of claim 5, wherein the one or more signal optimizations include at least one of the following:
   a signal gain adjustment;
   a shift in RF carrier channel;
   a signal phase adjustment; and
   a digital pre-distortion.

7. The system of claim 5, wherein the conditioner and control component modifies the data derived from the baseband data before a digital modulator re-modulates the data derived from the baseband data onto a second RF channel.

8. The system of claim 1, wherein the signal conditioning and control module is integrated within either the host unit or the first remote antenna unit.

9. The system of claim 1, wherein the signal conditioning and control module is implemented within an intervening device between the first remote antenna unit and the host unit.

10. The system of claim 1, wherein the signal conditioning and control module comprises a memory and a conditioner and control component, wherein the baseband data is extracted to the memory and the data derived from the baseband data is modified in the memory by the conditioner and control component.

11. The system of claim 1, wherein the first digitized RF signal is a downlink signal and an analog RF signal is generated by the first remote unit at least in part from the baseband data.

12. The system of claim 1, wherein the first digitized RF signal is an uplink signal generated by the first remote unit at least in part from the baseband data, the first digitized RF signal including the modified version of the first data stream.

13. The system of claim 1, wherein baseband data comprises one or both of digitized baseband RF data and digital baseband data.

14. The system of claim 1, wherein the signal conditioning and control module comprises a digital demodulator and a digital modulator, wherein the digital demodulator demodulates the baseband data from a first RF channel and the digital modulator re-modulates the baseband data onto a second RF channel.

15. The system of claim 1, wherein the data derived from the baseband data comprises at least one of:
   at least a portion of the baseband data;
   digitally down-converted data;
   decoded data;
   encoded data; and
   digitally up-converted data.

16. A method for a digital distributed antenna system, the digital distributed antenna system including a host unit, and a plurality of remote antenna units each communicatively coupled to the host unit, wherein a first digitized RF signal comprising a plurality of data streams is communicated between the host unit and a first remote antenna unit of the plurality of remote antenna units, the method comprising:
   receiving the first digitized RF signal at a signal conditioning and control module associated with a first remote antenna unit of the plurality of remote antenna units;
   with the signal conditioning and control module:
      removing from the first digitized RF signal an original version of at least a first data stream;
      converting the original version of the first data stream to baseband data; and
      replacing the original version of the first data stream in the first digitized RF signal with a modified version of the first data stream by modifying data derived from the baseband data.

17. The method of claim 16, wherein, wherein the first digitized RF signal further comprises a second data stream not removed from the first digitized RF signal by the signal conditioning and control module.

18. The method of claim 16, wherein, the method further comprising:
   transporting the modified version of the first data stream to the host unit where it is combined with at least one corresponding data stream from at least one other remote antenna unit into a unified data stream.

19. The method of claim 16, wherein the first remote unit comprises a conditioner and control component, the method further comprising:
   with the conditioner and control component, applying one or more signal optimizations to the data derived from the baseband data.

20. The method of claim 19, wherein the one or more signal optimizations include at least one of the following:
   a signal gain adjustment;
   a shift in RF carrier channel;
   a signal phase adjustment; and
   a digital pre-distortion.

21. The method of claim 19, wherein the conditioner and control component modifies the data derived from the baseband data before a digital modulator re-modulates the baseband data onto a second RF channel.

22. The method of claim 16, wherein the data derived from the baseband data comprises at least one of:
    at least a portion of the baseband data;
    digitally down-converted data;
    decoded data;
    encoded data; and
    digitally up-converted data.

\* \* \* \* \*